United States Patent [19]

Taniguchi et al.

[11] Patent Number: 4,760,426
[45] Date of Patent: Jul. 26, 1988

[54] IMAGE RECORDING APPARATUS

[75] Inventors: Isao Taniguchi; Minoru Ishikawa; Akihiko Nagumo, all of Kanagawa, Japan

[73] Assignee: Fuji Photo Film Co., Ltd., Kanagawa, Japan

[21] Appl. No.: 942,654

[22] Filed: Dec. 17, 1986

[30] Foreign Application Priority Data

Dec. 20, 1985 [JP] Japan ............... 60-287492
Dec. 23, 1985 [JP] Japan ............... 60-289703
Jan. 17, 1986 [JP] Japan ............... 61-7487
Jan. 20, 1986 [JP] Japan ............... 61-9724
Jan. 29, 1986 [JP] Japan ............... 61-17562
Mar. 10, 1986 [JP] Japan ............... 61-51896

[51] Int. Cl.$^4$ .............................. G03G 15/01
[52] U.S. Cl. .................................... 355/27
[58] Field of Search ............... 355/27, 79, 28; 250/318, 319; 358/303; 430/138, 203, 206–208

[56] References Cited

U.S. PATENT DOCUMENTS 4,501,809  2/1985  Hiraishi et al. ............... 430/138
4,629,675 12/1986  Takehara et al. ............. 430/207 X
4,659,927  4/1987  Tago et al. .................. 250/319 X

FOREIGN PATENT DOCUMENTS

57-179836 11/1982 Japan .
60-121284  6/1985 Japan .
60-117089  6/1985 Japan .

Primary Examiner—L. T. Hix
Assistant Examiner—D. Rutledge
Attorney, Agent, or Firm—Sughrue, Mion, Zinn, Macpeak & Seas

[57] ABSTRACT

An image recording apparatus which makes use of a photosensitive and pressure-sensitive thermally developable medium having a carrier and a photosensitive substance applied to the surface of said carrier that is capable of developing a latent image thereon by application of heat and stabilizing the developed image by application of pressure, said apparatus comprising: exposure means; heating developing means; and transferring means for superposing an image receiving sheet member onto said photosensitive and pressure-sensitive developable medium and for pressurizing said image receiving sheet member and said photosensitive and pressure-sensitive developable medium together.

21 Claims, 6 Drawing Sheets

IMAGE RECORDING APPARATUS

BACKGROUND OF THE INVENTION

1. Field of the Invention

The present invention relates to an image recording apparatus for recording an image by using a photosensitive and pressure-sensitive developable medium.

More particularly, the photosensitive and pressure-sensitive developable medium has a carrier and a substance applied to the surface of the carrier which is capable of developing a latent image thereon by application of heat and stabilizing the developed image by application of pressure. In operation, the photosensitive and pressure-sensitive developable medium is exposed so that a latent image is formed on the medium. The medium is then developed by application of heat and the developed image is transferred to an image receiving sheet member superposed on the medium and pressurized together with the medium, whereby an image is formed on the image receiving sheet member.

2. Description of the Prior Art

Image recording media making use of microcapsules containing photosensitive compositions are known. One such image recording medium is disclosed, for example, in Japanese Patent Laid-Open No. 179836/1982. This image recording medium has a carrier and capsules having polymeric resinous walls, each capsule containing a vinyl compound, photopolymerization initiator, and a coloring agent precursor. In operation, the medium is exposed so that the microcapsules are set in accordance with the pattern of the image. Then, the medium is pressurized so that the microcapsules which have not been set are ruptured so as to release the coloring agent precursor, thereby forming a color image. This image recording system offers an advantage in that a high quality of image is obtainable with a simple, dry process, but suffers from a disadvantage in that the photosensitivity of the medium is much lower than that of the medium which incorporates silver halide.

Under these circumstances, the present inventors have proposed, in the specification of Japanese Patent Application No. 117089/1985, a novel image recording medium which has a high photosensitivity and which is capable of providing a high quality of recorded image by a simple dry process, thereby overcoming the above-described problem.

This recording medium is a thermally-developable medium having sensitivity both to light and to pressure. More specifically, this recording medium has a carrier on which is applied a substance which contains at least photosensitive silver halide, a reducing agent, a polymerizable compound and a color image forming agent, wherein at least the polymerizable compound and the color image forming agent are contained in common microcapsules.

A method of recording an image by using this thermally-developable photo- and pressure-sensitive developable medium is disclosed in the specification of Japanese Patent Application No. 121284/1985 filled by the same applicant. According to this method, the thermally-developable photo- and pressure-sensitive developable medium is exposed so that a latent image is formed thereon. Subsequently, heat is applied to the medium so that the polymerizable compound is polymerized in the region where the latent image is formed so that the microcapsules are thermally set, thus developing the latent image. Then, an imagereceiving sheet member, which has an image-receiving layer to which an image is transferable, is superposed on the medium carrying the developed image and both media are pressurized together so that at least a part of the microcapsules in the region where no latent image have existed are ruptured to release the color image forming agent, thus forming an image on the image-receiving sheet member.

However, no image recording apparatus has been proposed which makes use of the photo- and pressure-sensitive thermally-developable medium and which is capable of automatically performing a series of operations including the exposure, development by application of heat, superposition of the image-receiving sheet member and transfer and recording of the image by application of pressure.

SUMMARY OF THE INVENTION

Accordingly, an object of the present invention is to provide an image recording apparatus which makes use of the above-mentioned novel photo- and pressure-sensitive thermally-developable medium and which is capable of fully automatically performing the recording process from the exposure through to the formation of the image on the image-receiving sheet member.

Another object of the present invention is to provide an image recording apparatus which is capable of providing a high efficiency of color generating reaction on the image-receiving sheet member to which an image has been transferred, and stabilizing the thus formed color image, thereby assuring a high quality of the recorded image.

A further object of the present invention is to provide an image recording apparatus which is readily capable of separating a image-receiving sheet member from a photosensitive and pressure-sensitive medium.

A further object of the present invention is to provide an image recording apparatus which is capable of recording an image over the whole surface of an image-receiving sheet member.

Another object of the present invention is to provide an image recording apparatus which prevents a photosensitive and pressure-sensitive medium from fogging.

Another object of the present invention is to provide an image recording apparatus which is controlled so as to record images having desired density and colour balance.

A further object of the present invention is to provide an image recording apparatus in which a photosensitive and pressure-sensitive medium is developed after superposing an image-receiving sheet member on the photosensitive and pressure-sensitive medium, so that the development can be effected with high stability in an atmosphere which has only a small oxygen content.

According to the present invention, the above and other objects can be accomplished by an image recording apparatus which makes use of a photosensitive and pressure-sensitive thermally developable medium having a carrier and a photosensitive substance applied to the surface of said carrier that is capable of developing a latent image thereon by application of heat and stabilizing the developed image by application of pressure, said apparatus comprising: exposure means for exposing said photosensitive and pressure sensitive developable medium to an image thus forming a latent image on the surface of said photosensitive and pressure sensitive developable medium; heating developing means for setting the portion of said photosensitive and pressuresensitive developable medium carrying said latent image thereby stabilizing said latent image; and transferring means for superposing an image receiving sheet member onto said photosensitive and pressure-sensitive developable medium and for pressurizing said image receiving sheet member and said photosensitive and pressure-sensitive developable medium together.

In one aspect of the present invention, there is provided an image recording apparatus which makes use of a photosensitive and pressure-sensitive thermally developable medium having a carrier and a photosensitive substance applied to the surface of said carrier that is capable of developing a latent image thereon by application of heat and stabilizing the developed image by application of pressure, said apparatus comprising: exposure means for exposing said photosensitive and pressure sensitive development medium to an image thus forming a latent image on the surface of said photosensitive and pressure sensitive development medium; heating developing means for setting the portion of said photosensitive and pressure-sensitive medium carrying said latent image thereby stabilizing said latent image; transferring means for superposing an image receiving sheet member onto said photosensitive and pressure-sensitive developable medium and for pressurizing said image receiving sheet member and said photosensitive and pressure-sensitive developable medium together thereby transferring the developed image; and fixing means for fixing the transferred image by applying light, pressure or heat to said image receiving sheet member.

In another aspect of the present invention, there is provided an image recording apparatus which makes use of a photosensitive and pressure-sensitive thermally developable medium having a carrier and a photosensitive substance applied to the surface of said carrier that is capable of developing a latent image thereon by application of heat and stabilizing the developed image by application of pressure, said apparatus comprising: exposure means for exposing said photosensitive and pressure sensitive development medium to an image thus forming a latent image on the surface of said photosensitive and pressure sensitive development medium; superposing means for superposing an image-receiving sheet member on said photosensitive and pressure-sensitive thermally developable medium after the exposure; heating developing means for setting the portion of said photosensitive and pressuresensitive thermally-developable medium carrying said latent image with said image-receiving sheet member superposed thereon so as to stabilize said latent image; and transferring means for pressurizing said photosensitive and pressuresensitive developable medium carrying the developed image together with said image receiving sheet member superposed thereto.

The above and other objects and features of the present invention will become apparent from the following descriptions of preferred embodiments made with reference to the accompanying drawings.

DETAILED DESCRIPTION OF THE PREFERRED EMBODIMENTS

Preferred embodiments of the present invention will be described hereinunder with reference to the accompanying drawings.

Figure 1:
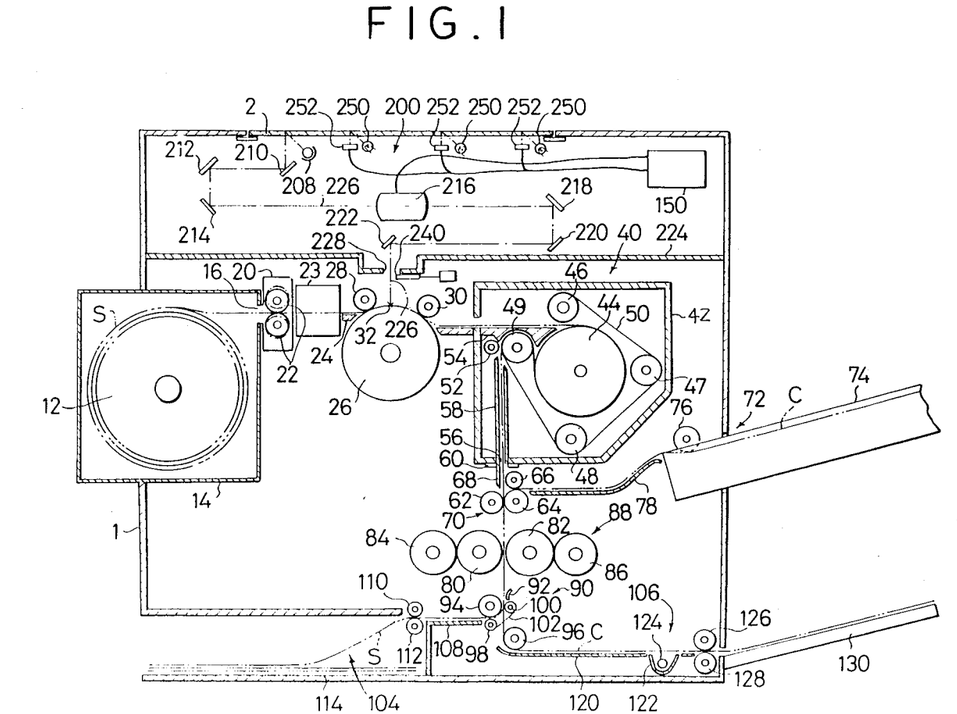
FIG. 1 is a sectional view illustrating the construction of a first embodiment of an image recording apparatus in accordance with the present invention.

Referring to FIG. 1 which is a sectional view of an embodiment of the image recording apparatus in accordance with the present invention, an original supporting platen glass 2 is mounted on the top of a housing 1.

As image-forming optical system 200 of an image forming lens moving type which is known per se is disposed under the platen glass 2. More specifically, the image-forming optical system includes an illuminating lamp 208 for scanning the entire area of the lower side of the platen glass 2, mirrors 210, 218, 220, and an assembly 216 of an image-forming lens and a filter unit, mirrors 212, 214 adapted to move in the same direction as and at a speed which is half the speed of movement of the illuminating lamp 208, and a stationary mirror 222.

The image-forming optical system 200 in the housing 1 is separated by a partition wall 224 from other portions in the housing 1. An aperture 228 is formed in the portion of the partition wall 224 through which the axis 226 of the light reflected from the stationary mirror 222 of the optical system 200 passes, and a shutter 240 is disposed in the aperture 228. Upwardly-directed lamps 250 and photosensors 252 associated with these lamps are disposed under the platen glass 2, so as to measure the density of the image on the original carried by the platen glass 2.

Figure 2:
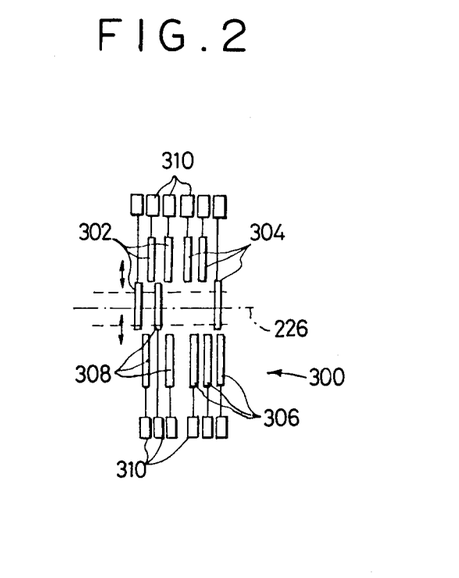
FIG. 2 is an illustration of the construction of a filter unit of the first embodiment.

As will be seen from FIG. 2, the filter unit 300 of the assembly 216 includes a plurality of types of filters such as red filters 302, green filters 304, blue filters 306 and ND filters 308 which are supported by respective solenoids 310. The filters of each type have different values of transmission factor. The arrangement is such that the solenoids 310 are selectively activated to put any desired filter or filters 302, 304, 306 into the path of the axis 226.

A photosensitive developable medium S (hereinafter referred to as "photosensitive medium S"), is stored in the form of a roll 12 which is accommodated by a cartridge 14 which in turn is detachably attached to one side of the housing 1. A pair of photosensitive developable medium supply rolls 22,22 are disposed in a magazine-adapter dark box 20 located at the outlet 16 for the photosensitive medium S in the cartridge 14, so as to pull and feed a predetermined length of the photosensitive medium S from the roll 12.

The rolls 22, 22, when approached by the leading end of the photosensitive medium S, move apart from each other to positions shown by the imaginary lines, thus facilitating the passage of the photosensitive medium S. A cutter unit 23 for cutting the photosensitive medium S and a guide plate for guiding the same are disposed ahead of the magazine-adapter dark box 20, i.e. downstream of the dark box 20 as viewed in the direction of movement of the photosensitive medium S.

A photosensitive medium supporting roll 26 for supporting the photosensitive medium S during the exposure is disposed downstream of the guide plate 24. A pair of nip rolls 28 and 30 are held in contact with the supporting roll 26. The photosensitive medium S, which has been guided by the guide roll 24 to the position on the supporting roll 26, is held in close contact with the supporting roll 26 by the nip rolls 28, 30 and the portion of the photosensitve medium S positioned between two nip rolls 28 and 30 is exposed to the original through the optical system.

A heating developing device 40 disposed downstream of the supporting roll 26 is adapted to heat the exposed photosensitive medium S thereby developing a latent image on the photosensitive medium S. The heating developing device 40 includes a heat-insulating developing housing 42, a heating roll 44 disposed in the developing housing 42 and maintained at an elevated temperature of about 120° C., and an endless belt 50 going around four belt supporting rolls 46, 47, 48 and 49 and surrounding the heating roll 44 through about 270°, and a nip roll 52 which is held in pressure contact with the supporting roll 49.

The heating developing device 40 further has a guide device 54 which is adapted for guiding the photosensitive medium S from the supporting roll 26 onto the heating roll 44 and to separate the photosensitive medium S after the heat-development from the heating roll 44, a vertical guide device 58 adapted for guiding the photosensitive medium S sent by the supporting roll 49 and the nip roll 52 towards an outlet 56, and a sensor 60 provided at the outlet 56 and adapted for sensing the leading end of the photosensitive medium S.

An image-receiving sheet member superposing device 70, which is disposed immediately below the outlet 56, has a pair of pressing rolls 62, 64, a nip roll 66 which is held in pressure contact with the pressing roll 64, and a guide member 68 which guides the photosensitive medium S guided by the rolls 64 and 66 to between the pressing rolls 62, 64.

Figure 7:
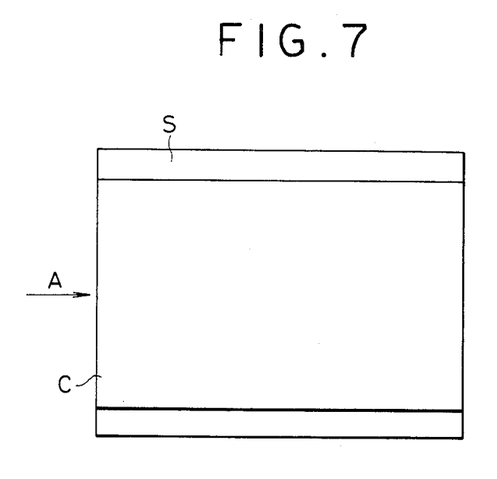
FIGS. 7 and 8 are plan views illustrating the state in which an image-receiving sheet member is superposed on a photosensitive medium.
Figure 8:
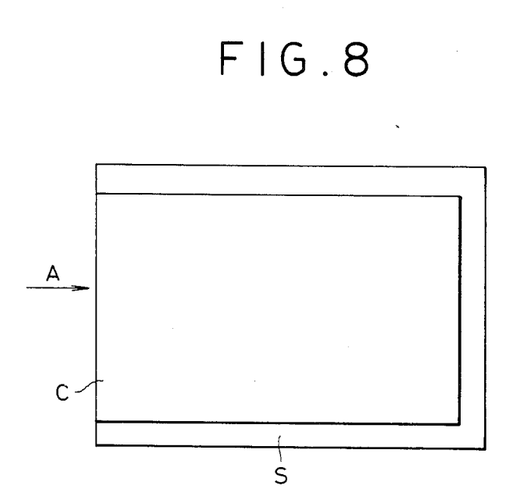

An image-receiving sheet member feeding device 72 is disposed on one side of the superposing device 70. The image-receiving sheet member feeding device 72 is constituted by an image-receiving sheet member feeding cassette 74 projecting from and detachably secured to the housing 1, an image-receiving sheet member feeding roll 76 for feeding the image-receiving sheet member C out of the cassette 74, and a guide plate 78 for guiding the image receiving sheet member C fed by the feeding roll 76 to between the pressing roll 64 and the nip roll 66. The image-receiving sheet member C has a width which is about 6 mm smaller than that of the photosensitive medium. The superposing device 70 is adapted to superpose this image-receiving sheet member C such that the latter is centralized with respect to the photosensitive medium S in the widthwise direction as shown in FIGS. 7 and 8. An arrow A designates the feed direction of the photosensitive medium S. The leading end of the photosensitive medium S is aligned with the leading end of the image-receiving sheet member C as shown in FIG. 7 or positioned several millimeters ahead thereof as shown in FIG. 8.

In the case where the image-receiving sheet member C is smaller than the photosensitive medium S and the former is centralized with respect to the latter in the widthwise direction and the feed direction, the image is recorded over the whole surface of the image-receiving sheet member C.

A transfer device 88 disposed under the superposing device 70 has a pair of pressurizing nip rolls 80, 82, and a pair of back-up rolls 84, 86 which act to even the distribution of the pressure exerted by the pressurizing nip rolls 80, 82 along the axis of the rolls 80, 82. The pressurizing nip rolls 80, 82 are held in contact with each other at a high pressure of about 200 kg/cm².

A sheet separating device 90 is disposed under the transfer device 88. The sheet separating device 90 has a guide member 92, a first feed roll 94, a second feed roll 96, and a separator belt 102 which goes around guide rolls 98, 100 in such a manner as to make pressure contact only with the photosensitive medium S at both axial ends of the first feed roll 94.

A photosensitive medium disposal section 104 is provided on one side of the sheet separating device 90, and a fixing device 106 is disposed on the other side of the same. The photosensitive medium disposal section 104 is constituted by a guide member 108, a pair of feed rolls 110, 112, and a disposal box 114. The photosensitive medium S coming from the sheet separating device 90 and guided by the guide member 108 is introduced by the feed rolls 110, 112 into the disposal box 114.

The fixing device 106 has a guide member 120, an ultraviolet lamp 124 with a reflecting member 122, and a pair of feed rolls 126, 128. The image-receiving sheet member C coming from the sheet separating device 90 and guided by the guide member 120 is irradiated with ultraviolet rays from the lamp 124 for about 5 seconds, so that the image on the image-receiving sheet member C is fixed.

A tray 130 for receiving the image-receiving sheet member C with fixed image thereon is attaced to one side of the housing 1 so as to project therefrom at a position ahead or downstream of the fixing device 106.

The image recording apparatus of the present invention further has an exposure amount control panel 150 disposed in a suitable portion of the housing and a controller which is not shown. The exposure amount control panel 150 is connected to the photosensors 252 and also to the solenoids 310 of the filter unit 300, so as to enable the operator to control the filter unit 300.

To the controller are connected the exposure amount control panel 150, shutter device 240, driving system (not shown) of the image-forming optical system, cutter unit 23, sensor 60 for sensing the leading end of the photosensitive developable medium, and the superposing device 70, and is adapted to perform the following controlling operation.

Figure 3:
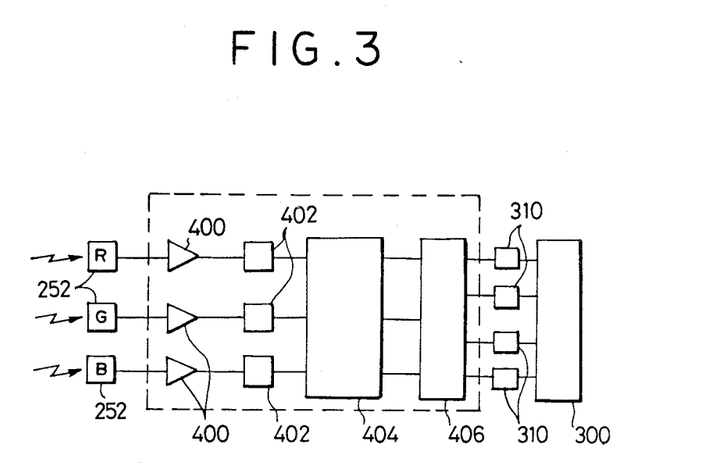
FIG. 3 is a block diagram of a filter unit control system of the first embodiment.

As shown by the block diagram in FIG. 3, a control system for the filter unit 300 includes amplifiers 400 for receiving the outputs from respective photosensors 252 and A/D converters for receiving the outputs from respective amplifiers 400. The control system further has a control circuit 404 for receiving the outputs from respective A/D converters 402, the control system also having a filter table which enables the desired filter to be selected in accordance with the signal to the control circuit 404. The output from the control circuit 404 is delivered through a solenoid driving circuit 406 to the solenoids 310, whereby the filter unit 300 is controlled.

In the preparatory stage of the recording or copying operation, an adjustment is conducted so as to position the leading end of the photosensitive medium S in the vicinity of the cutter unit 23 or within the magazine adapter dark box 20.

Then, the operator pushes a copy start button (not shown) so that the photosensitive medium feed rolls 22 operate to feed the photosensitive medium S until the leading end of the medium S reaches a position 32. In this state, the lamps 250 are turned on so as to enable the photosensors 252 to measure the density of the image at a plurality of positions on the original. Then, the solenoids 310 are activated in accordance with the results of measurement so as to bring the desired filter or filters 302, 304, 306 and 308 into the path of the axis 226 of the light beam. If necessary, the operator can put the desired filter or filters into the path of the axis 226 through manual operation of the exposure amount control panel 150.

Then, the illuminating lamp 208 is turned on and the image-forming optical system 200 commences a predetermined scanning operation, while the shutter device 240 operates to open the path of the light, thereby allowing the photosensitive material S to be exposed. Then, the photosensitive medium S is fed by a length corresponding to the length of the original in the feeding direction and the cutter unit 23 operates to cut the photosensitive medium S.

The exposed and cut photosensitive medium S is then sent to the heating developing device 40 and is pressed by the endless belt 50 onto the heating roll 44 so as to be heated by the latter up to about 120° C., whereby the image is developed. The photosensitive medium S after the development is discharged through the outlet 56. The passage of the leading end of the medium S through the outlet is sensed by the sensor 60.

Meanwhile, in the image-receiving sheet member feeding device 72, the image-receiving sheet member C is fed in response to the pushing of the copy start button or in synchronism with the start of the exposure until its leading end comes between the pressing roll 64 and the nip roll 66.

At the same time, the image-receiving sheet member superposing device 70 operates so as to superpose the image-receiving sheet member C onto the photosensitive medium S in such a manner that the narrower image-receiving sheet member C is centralized with respect to the wider photosensitive developable medium in the widthwise direction and the leading end of the photosensitive medium S is aligned with the leading end of the image-receiving sheet member C or positioned several millimeters ahead thereof. Then, the superposed photosensitive medium S and the image-receiving sheet material C are fed together to the transfer device 88 in which they are pressed to each other at a high pressure of about 200 kg/cm$^2$, whereby the developed image is transferred from the photosensitive medium S to the image-receiving sheet member C.

After the transfer, the photosensitive medium S is separated by the action of the separating belt 102 in the separating device 90, and is then delivered to the photosensitive developable medium disposal section 104. Meanwhile, the image-receiving sheet member C to which the image has been transferred is introduced into the fixing device 106 where the image is fixed by about a 5-second irradiation with ultraviolet rays. The image-receiving sheet member C with the fixed image thereon is then sent by the rollers 126, 128 to the tray 130.

The illuminating lamp 208 with the reflecting mirror may be of any type which can radiate rays including visible rays. Examples of such lamps are strobe lamps, flash lamps, tungsten lamps, mercury lamps, halogen lamps such as iodine lamps, xenon lamps, laser beams, CRT sources, plasma, fluorescent lamps and light-emitting diodes. It is also possible to use, in place of the lamp 8, a combination of a microshutter array which makes use of LCD (Liquid Crystal Display) or PLZT (titanium zirconate doped with lanthanum) and a linear or planar light source.

The heating in the heating developing device 40, which is effected by the heating roll 44 in the described embodiment, may be performed by any other suitable heating means such as a heating belt, a thermal head which incorporates an array of heating elements, electric resistance heating, and a microwave or infrared heating device. It is also possible to heat the photosensitive developable medium S by electric eddy currents generated therein through electromagnetic induction, depending on the nature of the photosensitive developable medium S. The heating also may be effected by dipping the photosensitive developable medium S in a bath of a heated luquid which is inert to the photosensitive developable medium, e.g., fluorine liquid. When such alternative heating means is used, the heating temperature preferably ranges between 80° and 200° C., more preferably between 100° and 160° C.

The transfer device 88, which is constituted by the pressurizing nip rollers 80, 82 and the back-up rollers 84, 86 in the described embodiment, may be composed of skew rollers or crown rollers which are arranged such that their axes interesect each other at a suitable angle.

Finally, the fixing device 106 may be of the type which fixes the image by a mere heating or pressing.

In the second to fourth embodiments as set forth hereinafter the same parts as in the first embodiments are designated by the same numbers as the first embodiment and the description thereof is therefore omitted.

Figure 4:
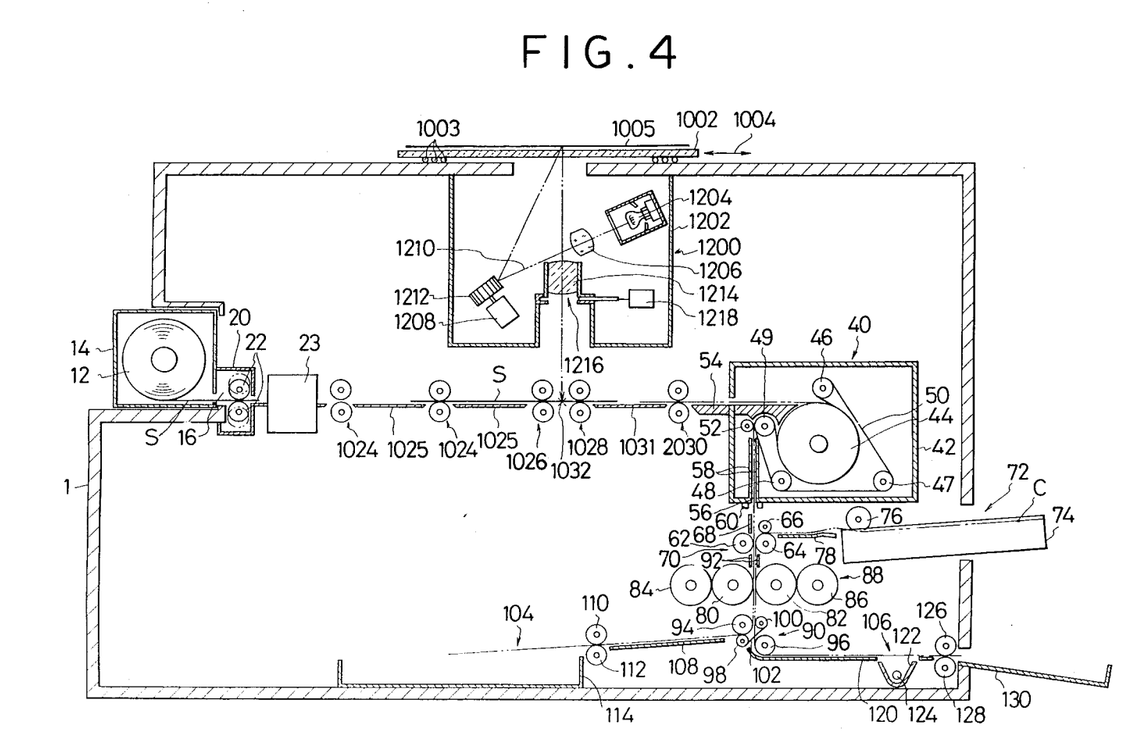
FIG. 4 is a sectional view illustrating the construction of a second embodiment of an image recording apparatus in accordance with the present invention.

Referring to FIG. 4 which is a sectional view of a second embodiment of the present invention, the image recording apparatus has an original carrier platen glass 1002 which is mounted through slide bearings 1003 on the top of a housing 1 for reciprocal sliding motion in the directions indicated by arrows 1004. The platen glass 102 carries an original 1005 which is placed thereon with its image surface directed downward.

An exposure device 1200 disposed under the path of sliding movement of the platen glass 1002 is adapted for causing the photosensitive medium S to be exposed to the image on the original.

The exposure device 1200 has a light source lamp 1204, a light converging lamp 1206, and a multi-sided mirror 1212 which is adapted to be rotated by a motor 1208 so as to unidimensionally oscillate the illuminating light beam 1210 from the light converging lens 1206. The light source lamp 1204, light converging lens 1206, and the multi-sided mirror 1212 are disposed in an illuminating housing 1202. The exposure device 1200 further has an image-forming lens 1214 for causing the image on the original 1005 scanned by the light beam to be focussed on the photosensitive medium S, and a shutter 1216 for selectively interrupting the optical path between the interior and the exterior of the housing 1202. The shutter 1216 is adapted to be driven by a shutter driving solenoid 1218.

A pair of nip rolls 1026, 1028 are disposed in the passage of the photosensitive medium S defined by feed rolls 1024 and guide plates 1025 so as to facilitate the passage of the photosensitive medium S over the exposure position 1032 where the exposure is effected. A pair of rolls 2030 and a guide plate 1031 are disposed downstream of the nip roll 1028.

In the apparatus as set forth above, the operator pushes a copy start button (not shown) so that the photosensitive medium S feed rolls 22 operate to feed the photosensitive medium S. Immediately before the leading end of the photosensitive medium S reaches a position 1032, the illumination lamp 1204 is turned on to illuminate the original. When the leading end of the photosensitive medium S has reached the position 1032, the shutter driving solenoid 1218 operates to open the shutter 1216 which has been closed and the original supporting platen glass 1002 is moved. At the same time, the photosensitive medium S is fed in synchronism with the movement of the platen glass 1002, so that the image on the original is projected onto the photosensitive medium S, whereby the latter is exposed. When the photosensitive medium S has been fed by a length equal to the stroke of the original, the cutter unit 23 operates to cut the photosensitive medium S. Meanwhile, the shutter 1216 is closed so as to interrupt the optical path between the interior and the exterior of the housing 1202.

Figure 5:
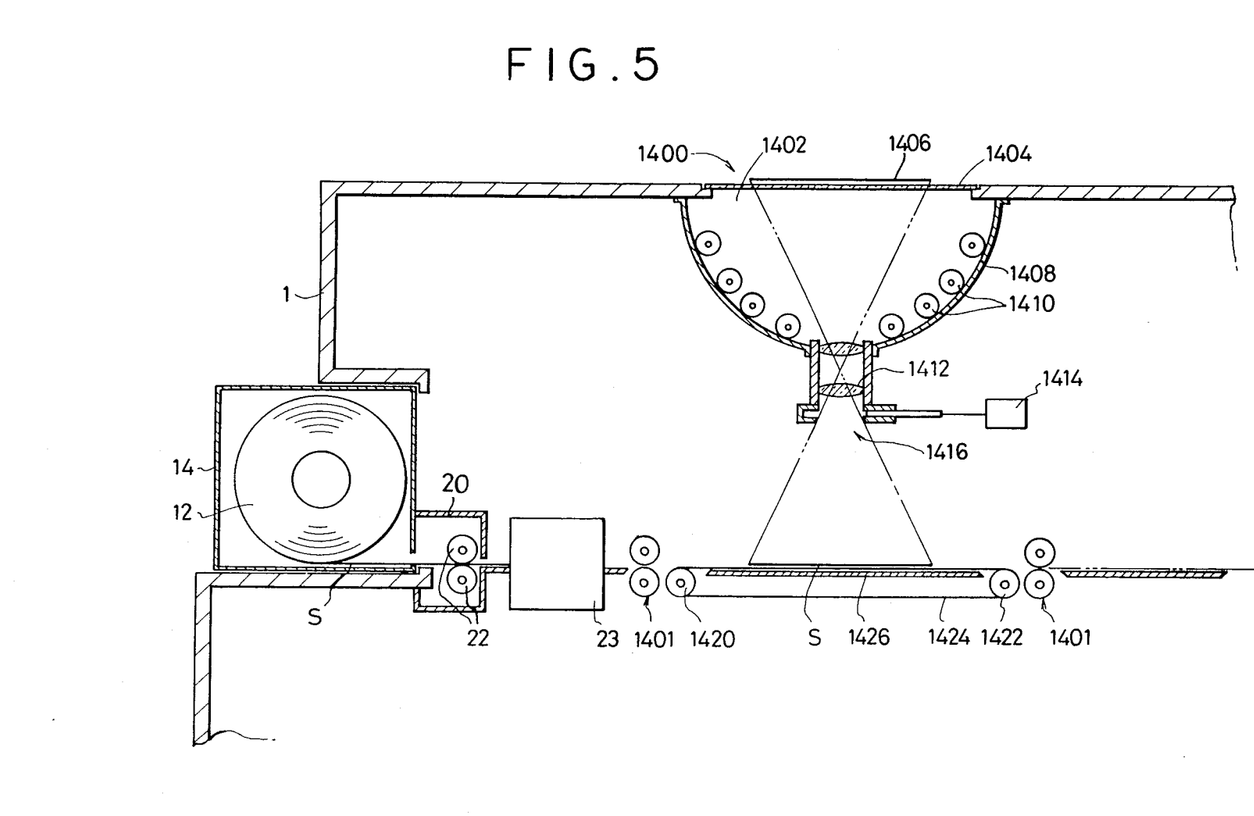
FIG. 5 is a sectional view illustrating the construction of an exposure device of a third embodiment of an image recording apparatus in accordance with the present invention.

Referring to FIG. 5, an exposure device 1400 of one shot exposure type of the third embodiment is described hereinafter. There is provided an original carrier glass plate 1404 which is mounted on the opening 1402 on the top of the housing 1. The platen glass 1404 carries an original 1406 which is placed thereon with its image surface directed downwards. The exposure device 1400 is located under the opening 1402 and provided with a plurality of linear light sources 1410, for example fluorescent lamps, and an illuminating housing 1408 having a reflecting inside surface. In the middle of the illuminating housing 1408 there are provided an image-forming lens 1412 and a shutter 1416 driven by a shutter driving solenoid 1414.

An endless belt 1424 driven by pulleys 1420, 1422 is provided between the pair of feed rollers 1401. The upper portion of the endless belt 1424 is guided by a guide plate 1426 so as to locate an exposure position of the photosensitive medium S.

In the third embodiment, after placing the desired original 1406 on the platen glass 1404, the shutter 1416 is opened by the solenoid 1414 and the light sources 1410 are lit, so that the entire sensitive surface of the photosensitive medium S is exposed at the same time. Then, the shutter 1416 is closed by the solenoid 1414.

Figure 6:
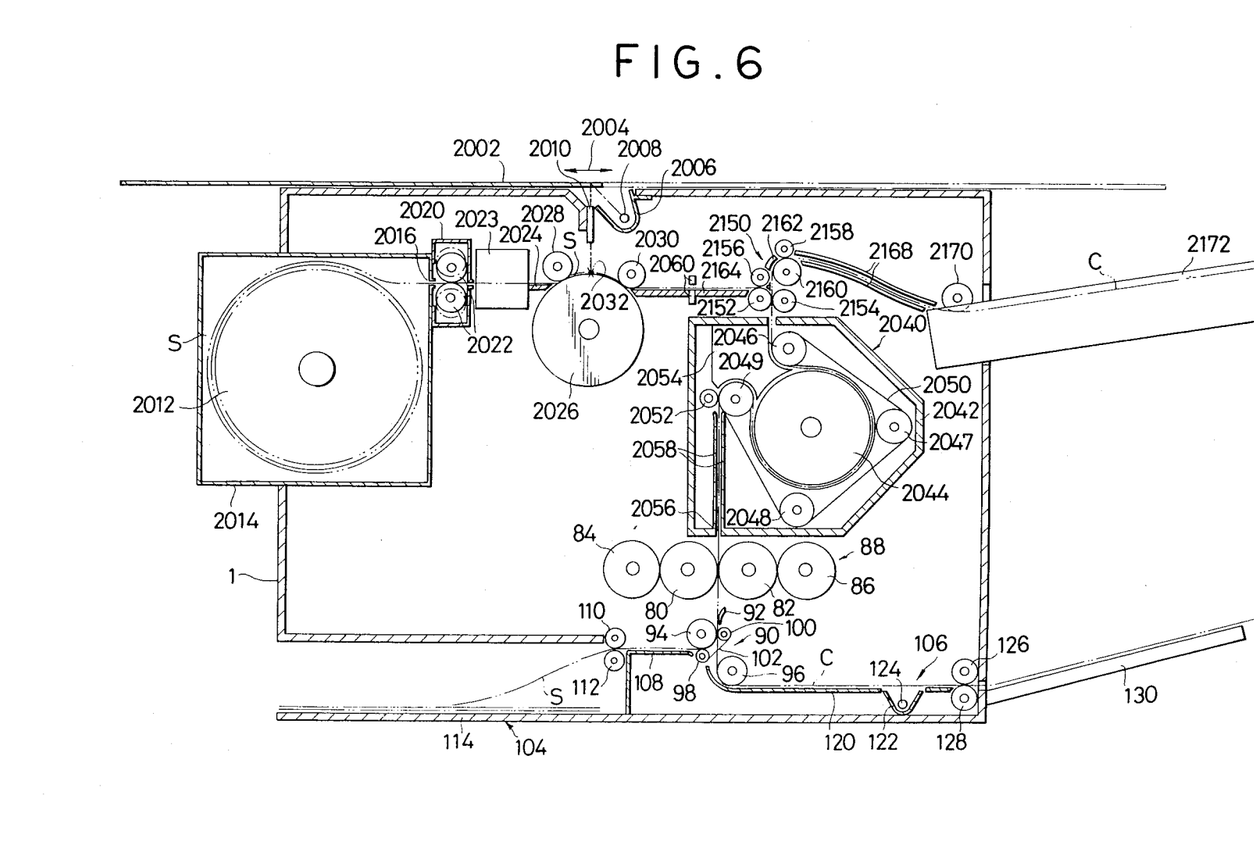
FIG. 6 is a sectional view illustrating the construction of the fourth embodiment of an image recording apparatus in accordance with the present invention.

Referring to FIG. 6 which is a sectional view of the fourth embodiment of the image recording apparatus in accordance with the present invention, an original supporting platen glass 2002 is mounted on the top of a housing 1 for reciprocal sliding motion in the directions indicated by arrows 2004. The platen glass 2002, therefore, is movable between a position indicated by the solid line and a position indicated by the imaginary line, with the original placed thereon such that the side of the original carrying an image is directed downward.

An illumination lamp 2008 with a mirror 2006, for lluminating the original, is disposed under the platen glass 2002. A fiber lens array 2010 is adapted for forming the image of the original on the photosensitive medium S which is disposed at a predetermined position.

The photosensitive medium S is stored in the form of a roll 2012 which is accommodated by a cartridge 2014 which in turn is detachably attached to one side of the housing 1. A pair of photosensitive medium supply rolls 22,22 are disposed in a magazine-adapter dark box 2020 located at the outlet 2016 for the photosensitive medium S in the catridge 2014, so as to pull and feed a predetermined length of the photosensitive developable medium from the roll 2012.

The rolls 2022, when approached by the leading end of the photosensitive medium S, move apart from each other to positions shown by the imaginary lines, thus facilitating the passage of the photosensitive medium S. A cutter unit 2023 for cutting the photosensitive medium S and a guide plate 2024 for guiding the same are disposed ahead of the magazine-adapter dark box 2020, i.e., downstream of the dark box 2020 as viewed in the direction of movement of the photosensitive medium S.

A photosensitive medium supporting roll 2026 for supporting the photosensitive medium S during the exposure is disposed downstream of the guide plate 2024. A pair of nip rolls 2028 and 2030 are held in contact with the supporting roll 2026. The photosensitive medium S, which has been guided by the guide plate 2024 to the position on the supporting roll 2026, is held in close contact with the supporting roll 2026 by the nip rolls 2028, 2030 and the portion of the photosensitive medium S positioned between the nip rolls 2028 and 2030 is exposed to the original through the fiber lens array 2010.

A superposing device 2150 is disposed downstream of the photosensitive medium supporting roll 2026. The superposing device 2150 has pressing rolls 2152, 2154, a nip roll 2156 which is held in pressure contact with the pressing roll 2152, and a pair of nip rolls 2158, 2160 for the image-receiving sheet material. A guide member 2162 is disposed between the nip roll 2156 and the pair of nip rolls 2158, 2160, while a horizontal guide plate 2164 is placed between the pressing roll 2156 and the photosensitive developable medium supporting roll 2026. A sensor 2060 for sensing the leading end of the photosensitive medium S is disposed on a suitable portion of the horizontal guide plate 2164.

Upper and lower guide plates 2168 are disposed on the rear side, i.e., upstream of the nip rolls 2158, 2160 for the image-receiving sheet member C. An image receiving sheet member supply cassette 2172, which is provided with a supply roll 2170, is secured to the housing 1 so as to project from the housing 1 at a portion near the inlet ends of the guide plates 2168. The image-receiving sheet member C has a width which is about 6 mm smaller than that of the photosensitive developable medium S. The superposing device 2150 is adapted to superpose the image-receiving sheet member C on the photosensitive medium S such that the sheet member C is centralized with respect to the medium S in the widthwise direction.

A heating developing device 2040 disposed under the superposing device 2150 is adapted to heat the exposed photosensitive medium S with the image-receiving sheet member C superposed thereto, thus developing a latent image on the photosensitive medium S. The heating developing device 2040 includes a heat-insulating developing housing 2042, a heating roll 2044 disposed in the developing housing 2042 and maintained at an elevated temperature of about 120° C., an endless belt 2050 going around four belt supporting rolls 2046, 2047, 2048 and 2049 and surrounding the heating roll 2044 through about 270°, and a nip roll 2052 which is held in pressure contact with the supporting roll 2049.

The heating developing device 2040 further has a guide device 2054 which is adapted for guiding the photosensitive medium S from the supporting roll 2026 onto the heating roll 2044 and to separate the photosensitive medium S after the heat-development from the heating roll 2044, and a vertical guide device 2058 adapted for guiding the photosensitive medium S sent by the supporting roll 2049 and the nip roll 2052 towards an outlet 2056.

The invention has thus been shown and described with reference to specific embodiments; however, it should be noted that the invention is in no way limited to the details of the illustrated arrangements, it being possible to make changes and modifications without departing from the scope of the appended claims.

What is claimed is:

1. An image recording apparatus which makes use of a photosensitive and pressure-sensitive thermally developable medium having a carrier and a photosensitive substance applied to the surface of said carrier that is capable of developing a latent image thereon by application of heat and stabilizing the developed image by application of pressure, at least part of said substance being contained in common microcapsules, said apparatus comprising:

exposure means for exposing said photosensitive and pressure sensitive developable medium to an image thus forming a latent image on the surface of said photosensitive and pressure sensitive developable medium;

heating developing means for setting the portion of said photosensitive and pressure-sensitive developable medium carrying said latent image so as to produce a developed image; and transferring means for superposing an image receiving sheet member onto said photosensitive and pressure sensitive developable medium and for pressurizing said image receiving sheet member and said photosensitive and pressure sensitive developable medium together so as to stabilize and transfer the developed image onto said image receiving sheet member through rupture of said common microcapsules under pressure.

2. An image recording apparatus according to claim 1, wherein said substance on said carrier of said photosensitive and pressure-sensitive developable medium includes at least a photosensitive silver halide, a reducing agent, a polymerizable compound and a color image forming agent, at least said polymerizable compound and said color image forming agent being contained by said common microcapsules.

3. An image recording apparatus according to claim 2, wherein said heating developing means is adapted to cause said polymerizable compound on the portion of said medium corresponding to said latent image to be polymerized, thereby setting said microcapsules.

4. An image recording apparatus according to claim 1, wherein said exposure means include an image reading section for forming image signals corresponding to the image on an original, an image processing section for effecting various types of processing such as enlargement, contraction, and color correction of the image, and an exposure section for exposing said photosensitive and pressure-sensitive developable medium in accordance with the image signals after processing by said image processing section.

5. An image recording apparatus which makes use of a photosensitive and pressure-sensitive thermally developable medium having a carrier and a photosensitive substance applied to the surface of said carrier that is capable of developing a latent image thereon by application of heat and stabilizing the developed image by application of pressure, at least part of said substance being contained in common microcapsules, said apparatus comprising:

exposure means for exposing said photosensitive and pressure sensitive development medium to an image thus forming a latent image on the surface of said photosensitive and pressure sensitive developable medium;

heating developing means for setting the portion of said photosensitive and pressure sensitive medium carrying said latent image to produce a developed image;

transferring means for superposing an image receiving sheet member onto said photosensitive and pressure sensitive developable medium and for pressurizing said image receiving sheet member and said photosensitive and pressure sensitive developable medium together so as to stabilize and transfer the developed image onto said image receiving sheet member through rupture of said common microcapsules under pressure; and fixing means for fixing the transferred image by applying light, pressure or heat to said image receiving sheet member.

6. An image recording apparatus according to claim 5, wherein said substance on said carrier of said photosensitive and pressure-sensitive developable medium includes at least a photosensitive silver halide, a reducing agent, a polymerizable compound and a color image forming agent, at least said polymerizable compound and said color image forming agent being contained by said common microcapsules.

7. An image recording apparatus according to claim 6, wherein said heating developing means is adapted to cause said polymerizable compound on the portion of said medium corresponding to said latent image to be polymerized, thereby setting said microcapsules.

8. An image recording apparatus according to claim 5, wherein said exposure means include an image reading section for forming image signals corresponding to the image on an original, an image processing section for effecting various types of processing such as enlargement, contraction, and color correction of the image, and an exposure section for exposing said photosensitive and pressure-sensitive developable medium in accordance with the image signals after processing by said image processing section.

9. An image recording apparatus according to claim 1, wherein said apparatus further includes superposing means for superposing an image-receiving sheet member on said photosensitive and pressure-sensitive developable medium so that the edges thereof are aligned with each other.

10. An image recording apparatus according to claim 9, wherein said superposing means is adapted to superpose said image-receiving sheet member on said photosensitive and pressure sensitive developable medium so that at least the edges of said medium and sheet member extending in the direction of feed are aligned with each other.

11. An image recording apparatus according to claim 9, wherein said superposing means is adapted to superpose said image-receiving sheet member on said photosensitive and pressure sensitive developable medium so that at least the edges of said medium and sheet member extending in the direction perpendicular to the direction of feed are aligned with each other.

12. An image recording apparatus according to claim 1, wherein said exposure means comprises a shutter means for selectively interrupting the optical path between said original and said photosensitive and pressure-sensitive thermally developable medium.

13. An image recording apparatus according to claim 12, wherein said exposure means is of one shot exposure type.

14. An image recording apparatus according to claim 12, wherein said exposure means is of slit-scanning exposure type.

15. An image recording apparatus according to claim 12, wherein said exposure means is of spot-scanning exposure type.

16. An image recording apparatus according to claim 1, wherein said apparatus further comprises density sensing means for sensing the density of said original; a filter unit disposed in said exposure means and adapted to control the extent of the exposure; and filter unit control means for controlling said filter unit in accordance with the output from said density sensing means.

17. An image recording apparatus according to claim 16, wherein said filter unit includes color filters.

18. An image forming apparatus according to claim 16, wherein said exposure means includes ND filters.

19. An image recording apparatus according to claim 16, wherein said exposure means includes a shutter disposed in the path of the exposure light and adapted to open only during the exposure.

20. An image recording apparatus according to claim 16, wherein said density sensing means includes a plurality of photosensors arranged so as to oppose the area where said original is to be placed.

21. An image recording apparatus which makes use of a photosensitive and pressure-sensitive thermally developable medium having a carrier and a photosensitive substance applied to the surface of said carrier that is capable of developing a latent image thereon by application of heat and stabilizing the developed image by application of pressure, at least part of said substance being contained in common microcapsules, said apparatus comprising:
  exposure means for exposing said photosensitive and pressure sensitive development medium to an image thus forming a latent image on the surface of said photosensitive and pressure sensitive development medium;
  superposing means for superposing an image-receiving sheet member on said photosensitive and pressure sensitive thermally developable medium after the exposure;
  heating developing means for setting the portion of said photosensitive and pressure sensitive thermally developable medium carrying said latent image with said image-receiving sheet member superposed thereon so as to produce a developed image; and
  transferring means for pressurizing said photosensitive and pressure sensitive developable medium carrying the developed image together with said image receiving sheet member superposed thereto to stabilize and transfer the developed image onto said image-receiving sheet member through rupture of said common microcapsules under pressure.

* * * * *